US012804499B2

(12) United States Patent
Yu et al.

(10) Patent No.: US 12,804,499 B2
(45) Date of Patent: Nov. 17, 2026

(54) COMMUNICATION METHOD AND RELATED DEVICE

(71) Applicant: Huawei Technologies Co., Ltd., Shenzhen (CN)

(72) Inventors: Guohua Yu, Shanghai (CN); Yong Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 642 days.

(21) Appl. No.: 18/202,816

(22) Filed: May 26, 2023

(65) Prior Publication Data

US 2023/0308977 A1 Sep. 28, 2023

Related U.S. Application Data

(63) Continuation of application No. PCT/CN2020/132947, filed on Nov. 30, 2020.

(51) Int. Cl.

*H04W 36/00* (2009.01)
*H04W 36/08* (2009.01)
*H04W 36/30* (2009.01)

(52) U.S. Cl.

CPC ..... *H04W 36/304* (2023.05); *H04W 36/0058* (2018.08); *H04W 36/08* (2013.01)

(58) Field of Classification Search

None
See application file for complete search history.

(56) References Cited

FOREIGN PATENT DOCUMENTS

| | | | | |
|---|---|---|---|---|
| CN | 109792347 A | | 5/2019 | |
| WO | WO-2014019139 A1 | * | 2/2014 | H04W 76/30 |
| WO | WO-2018056785 A1 | * | 3/2018 | H04W 72/20 |

OTHER PUBLICATIONS

Translation of WO2014019139 (Jiang et al.) (Year: 2014).*
3GPP TS 38.331 V16.2.0 (Sep. 2020), 3rd Generation Partnership Project; Technical Specification Group Radio Access Network; NR; Radio Resource Control (RRC) protocol specification (Release 16), total 921 pages.

* cited by examiner

*Primary Examiner* — Suhail Khan
(74) *Attorney, Agent, or Firm* — Slater Matsil, LLP

(57) ABSTRACT

In an embodiment a communication method includes receiving, by a network device, a measurement report from a terminal in a single-signaling connected state and determining, by the network device based on the measurement report, whether to release a communication connection to the terminal in the single-signaling connected state.

17 Claims, 4 Drawing Sheets

COMMUNICATION METHOD AND RELATED DEVICE

CROSS-REFERENCE TO RELATED APPLICATIONS

This application is a continuation of International Application No. PCT/CN2020/132947, filed on Nov. 30, 2020, the disclosure of which is hereby incorporated by reference in its entirety.

TECHNICAL FIELD

This application relates to the field of communication technologies, and in particular, to a communication method and a related device.

BACKGROUND

According to a 3rd Generation Partnership Project (3GPP) protocol, a network may initiate an RRC reconfiguration process to a terminal in a radio resource control (RRC) connected (RRC_CONNECTED) state. In the RRC reconfiguration process, the protocol further specifies that only when at least one data radio bearer (DRB) and a signaling radio bearer 2 (SRB2) are established after AS security is activated, and these radio bearers (RBs) are not suspended, a master cell group includes a synchronous reconfiguration information element (reconfigurationWithSync) that can be used for handover.

When RBs between a terminal and a base station include only a signaling radio bearer 0 (SRB0) and a signaling radio bearer 1 (SRB1), a connection status of the terminal may be referred to as a single-signaling connected state.

According to the foregoing protocol, the terminal cannot receive, within a time window, the synchronous reconfiguration information element (reconfigurationWithSync) used for handover, and therefore cannot initiate the handover. Consequently, non-access stratum (NAS) message transmission efficiency is low, service establishment is affected, a service establishment delay is prolonged, and the like.

In view of the foregoing problems, a current method is to set and start a timer when the terminal enters the single-signaling connected state. If the terminal detects no NAS message before the timer expires, a network device is directly triggered to release the terminal. Duration of the timer is configured by using an operations, administration and maintenance (OAM) network element. However, in this method, it is difficult to determine the duration of the timer.

A larger duration parameter value of the timer indicates a longer time for which the terminal in the single-signaling connected state waits to be released, that is, a lower possibility that the terminal in the single-signaling connected state is released. When quality of a signal between the terminal and a serving cell is poor, NAS message transmission, service establishment, and a service establishment delay of the terminal cannot be guaranteed.

A smaller duration parameter value of the timer indicates a shorter time for which the terminal in the single-signaling connected state to waits to be released, that is, a higher possibility that the terminal in the single-signaling connected state is released. Consequently, because the terminal that needs to establish a protocol data unit (PDU) session repeatedly attempts to access a network, an access delay of the terminal is prolonged, and a signaling storm is caused in an extreme scenario. After the terminal is released, if an NAS message needs to be transmitted or a service needs to be established between the network and the terminal subsequently, the terminal needs to re-establish an RRC connection, increasing system overheads and prolonging a service delay.

SUMMARY

Embodiments provide a communication method and a related device, to reduce service loss caused by a failure in performing a timely handover by a terminal.

Further embodiments provide a communication method, including:

A network device receives a measurement report (MR) from a terminal in a single-signaling connected state, and determines, based on the measurement report, whether to release a radio resource control (RRC) connection to the terminal in the single-signaling connected state.

Radio bearers RBs between the terminal in the single-signaling connected state and the network device include only a signaling radio bearer 0 (SRB0) and a signaling radio bearer (SRB1).

According to the method, the terminal in the single-signaling connected state is released at a proper time occasion. In this way, it can be ensured that a terminal that cannot continue to receive a service of a current serving cell can be released in time, thereby mitigating service impact caused because handover cannot be performed in time. In addition, it can be further ensured that a terminal that can normally receive the service of the current serving cell is not released in advance, thereby reducing system overheads and shortening an access delay.

According to the first aspect, in a first possible implementation of the communication method, the method further includes: The network device sends a measurement configuration to the terminal, where the measurement configuration includes a measurement object and a reporting condition.

The network device may send the measurement configuration to the terminal by using RRC signaling. The measurement configuration includes the measurement object and the reporting condition that are configured by the network device for the terminal. In an aspect, the measurement object indicates measurement to be performed by the terminal. In another aspect, the reporting condition indicates a specific mechanism used by the terminal to report a measurement result.

According to the first possible implementation of the first aspect, in a second possible implementation of the communication method, the measurement object includes at least one of the following:

- a serving cell currently connected to the terminal, and at least one neighboring cell of the currently connected serving cell.

The network device sets a measurement object of the terminal based on a measurement requirement. After receiving the measurement object, the terminal may measure the measurement object, that is, may measure the serving cell currently connected to the terminal, or may measure a plurality of neighboring cells of the current serving cell, to meet a requirement of reconnection in a subsequent step after a radio resource control connection is released.

According to the first possible implementation of the first aspect, in a third possible implementation of the communication method, the reporting condition includes at least one of the following: a measurement event and a reporting periodicity.

After the terminal obtains the measurement result, if the reporting condition is satisfied, the terminal sends the measurement result to the network device. There are two manners of reporting the measurement result to the network device: periodic reporting and event-triggered reporting. The periodic reporting means that the network device configures a reporting periodicity for the terminal, and the terminal may trigger reporting when the reporting periodicity is reached. The event-triggered reporting means that the network device configures a measurement event for the terminal, and the terminal may trigger reporting if a measurement result of the terminal meets a requirement of the measurement event. The terminal may report the measurement result through the measurement report (MR).

According to the third possible implementation of the first aspect, in a fourth possible implementation of the communication method, the measurement event includes at least one of the following:

Event A2: signal quality of a serving cell is lower than an absolute threshold;

Event A3: signal quality of a neighboring cell is higher than that of a serving cell by an offset value;

Event A4: signal quality of a neighboring cell is higher than an absolute threshold;

Event A5: signal quality of a serving cell is lower than a first absolute threshold, and signal quality of a neighboring cell is higher than a second absolute threshold;

Event B1: signal quality of a neighboring cell is higher than an absolute threshold; and Event B2: signal quality of a serving cell is lower than a first absolute threshold, and signal quality of a neighboring cell is higher than a second absolute threshold.

The signal quality of the serving cell or the neighboring cell may be a reference signal measurement value of the currently connected serving cell or the neighboring cell. In this application, the reference signal measurement value includes a reference signal received power (RSRP), reference signal received quality (RSRQ), a signal to interference plus noise ratio (SINR), or a received signal strength indicator (RSSI). In this application, a reference signal of the serving cell or the neighboring cell may include a synchronization signal and physical broadcast channel block (SSB) or a channel state information reference signal (CSI-RS). In this application, a reference signal of the terminal may include a sounding reference signal (SRS).

There are two types of the measurement events: Intra-RAT measurement events (including intra-frequency and inter-frequency measurement events): Event A1: signal quality of a serving cell is higher than an absolute threshold; Event A2: signal quality of a serving cell is lower than an absolute threshold; Event A3: signal quality of a neighboring cell is higher than that of a serving cell by an offset value; Event A4: signal quality of a neighboring cell is higher than an absolute threshold; and Event A5: signal quality of a serving cell is lower than a first absolute threshold, and signal quality of a neighboring cell is higher than a second absolute threshold. Inter-RAT measurement events: Event B1: signal quality of a neighboring cell is higher than an absolute threshold; and Event B2: signal quality of a serving cell is lower than a first absolute threshold, and signal quality of a neighboring cell is higher than a second absolute threshold. The network device may select the measurement events for configuration based on a measurement requirement. All Event A2 to Event B2 in the measurement events may be configured in this method, and are used to trigger the reporting condition.

According to the fourth possible implementation of the first aspect, in a fifth possible implementation of the communication method, the measurement report includes at least one measurement event.

When a reporting type of the measurement result is event-triggered reporting, the reported measurement report in this case includes a measurement event that the measurement result of the terminal meets. The network device may determine, based on the measurement report, to release the radio resource control connection to the terminal.

With reference to the fourth possible implementation of the first aspect, in a sixth possible implementation of the communication method, the measurement report includes a reference signal measurement value of at least one serving cell or neighboring cell.

When a reporting type of the measurement result is periodic trigger reporting, the reported measurement report in this case includes a measurement result of measurement performed by the terminal on at least one currently connected serving cell or neighboring cell. The network device may determine, based on the measurement report, whether to release the radio resource control connection to the terminal. For example, if determining that the reference signal measurement value of the serving cell included in the measurement report is less than an absolute threshold, or the reference signal measurement value of the neighboring cell is greater than an absolute threshold, or the reference signal measurement value of the neighboring cell is greater than a reference signal measurement value of the current serving cell by an offset value, the network device determines to release the radio resource control connection to the terminal.

According to the first aspect, in a seventh possible implementation of the communication method, before performing the release, the method further includes: detecting a connection status of the terminal, and performing the release when determining that the terminal is in the single-signaling connected state.

Before determining, based on the measurement report, to release the radio resource control connection to the terminal, the network device detects the connection status of the terminal again, and when determining that the terminal is in the single-signaling connected state, performs the release, to avoid service data loss caused by incorrect release of a terminal in a non-single-signaling connected state.

According to the first aspect, in an eighth possible implementation of the communication method, the method further includes:

after completing the release, enabling the terminal to send a connection establishment request to a neighboring cell whose signal quality is better than that of a serving cell connected to the terminal before the release.

For example, the network device may include, in a release message sent to the terminal, an identifier of the neighboring cell whose signal quality is better than that of the serving cell. After the release is completed, the terminal is enabled to initiate the connection establishment request to the neighboring cell with better signal quality, to implement reconnection to the serving cell.

To achieve the foregoing objective, a second aspect of this application provides a communication method, including:

A network device receives a reference signal sent by a terminal in a single-signaling connected state, and determines quality of a channel between the terminal in the single-signaling connected state and the network device based on a measurement value of the reference signal. The network device determines, based on the channel quality, whether to release a radio resource control (RRC) connection to the terminal.

Radio bearers RBs between the terminal in the single-signaling connected state and the network device include only a signaling radio bearer 0 (SRB0) and a signaling radio bearer (SRB1).

In this application, the reference signal of the terminal may include a sounding reference signal (SRS). The network device evaluates the channel quality by using the received sounding reference signal, and determines, based on the channel quality, whether to release a radio resource control connection to the terminal in the single-signaling connected state.

According to the method, the terminal in the single-signaling connected state is released at a proper time occasion. In this way, it can be ensured that a terminal that cannot continue to receive a service of a current serving cell is released in time, thereby mitigating service impact caused because handover cannot be performed in time. In addition, it can be further ensured that a terminal that can normally receive the service of the current serving cell is not released in advance, thereby reducing system overheads and shortening an access delay.

To achieve the foregoing objective, a third aspect of this application provides a communication device, including:

a bus;

a communication interface connected to the bus;

at least one processor connected to the bus; and at least one memory, where the memory is connected to the bus and stores program instructions, and when the program instructions are executed by the at least one processor, the at least one processor is enabled to perform the method of any one of the communication methods.

To achieve the foregoing objective, a fourth aspect of this application provides a computer-readable storage medium storing program instructions. When the program instructions are executed by a computer, the computer is enabled to perform the method of any one of the communication methods.

To achieve the foregoing objective, a fifth aspect of this application provides a computer program product, including program instructions. When the program instructions are executed by a computer, the computer is enabled to perform the method of any one of the communication methods.

To achieve the foregoing objective, a sixth aspect of this application provides a communication apparatus, and the apparatus is configured to perform the method of any one of the communication methods.

These aspects and another aspect of this application will be clearer and easier to understand in descriptions of the following (a plurality of) embodiments.

BRIEF DESCRIPTION OF THE DRAWINGS

The following further describes features of this application and a relationship between the features with reference to the accompanying drawings. The accompanying drawings are all examples, and some features are not shown in actual proportions. In addition, in some accompanying drawings, common features that are not mandatory for this application in the field of this application may be omitted. Alternatively, additional features that are not mandatory for this application are not shown. A combination of the features shown in the accompanying drawings is not intended to limit this application. In addition, in this specification, content referred to by same reference signs is also the same. The specific accompanying drawings are described as follows.

Figure 1:
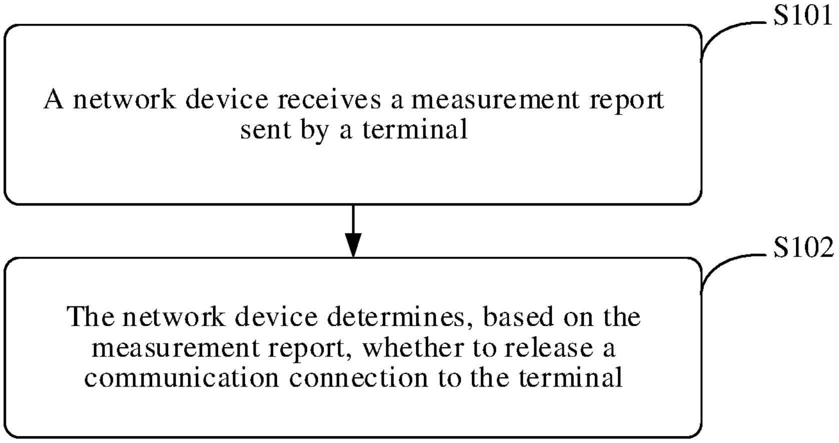
FIG. 1 is a flowchart of a communication method according to an embodiment of this application.

Descriptions of reference numerals:

Network device 400; Configuration unit 401; Communication unit 402; Release unit 403; Network device 500; Configuration unit 501; Communication unit 502; Detection unit 503; Release unit 504; Communication device 1000; Processor 1010; Memory 1020; Communication interface 1030; Bus 1040.

DETAILED DESCRIPTION OF ILLUSTRATIVE EMBODIMENTS

To make the objectives, technical solutions, and advantages of embodiments of this application clearer, the following clearly and completely describes the technical solutions in embodiments of this application with reference to the accompanying drawings in embodiments of this application. Clearly, the described embodiments are merely some rather than all of embodiments of this application. Generally, components of embodiments of this application described and shown in the accompanying drawings herein may be arranged and designed in various configurations. Therefore, the following detailed descriptions of embodiments of this application provided in the accompanying drawings are not intended to limit the scope of the claimed application, but merely to represent selected embodiments of this application. All other embodiments obtained by a person skilled in the art based on embodiments of this application without creative efforts shall fall within the protection scope of this application.

In this specification and claims, the terms "first, second, third, and the like" or similar terms such as a module A, a module B, and a module C are merely used to distinguish between similar objects, and do not represent a specific order of the objects. It may be understood that specific orders or sequences may be exchanged if permitted, so that embodiments of this application described herein can be implemented in an order other than an order illustrated or described herein.

In the following descriptions, involved reference numerals such as S110 and S120 that indicate steps do not necessarily indicate that the steps are to be performed based on the order, and consecutive steps may be transposed if allowed, or may be performed simultaneously.

The term "include" used in this specification and claims should not be construed as being limited to the content listed below, and does not exclude other elements or steps. It should be construed as specifying existence of a mentioned feature, whole, step, or part, but does not preclude existence or addition of one or more other features, wholes, steps, or parts and their groups. Therefore, the expression "a device including an apparatus A and an apparatus B" should not be limited to a device including only the components A and B.

"One embodiment" or "an embodiment" mentioned in this specification indicates that a particular feature, structure or property that is described with reference to the embodiment is included in at least one embodiment of this application. Therefore, the terms "in one embodiment" or "in an embodiment" that appear in this specification do not necessarily indicate a same embodiment, but may indicate a same embodiment. Further, in one or more embodiments, the particular features, structures, or properties can be combined in any proper manner, as will be clear from this disclosure to a person of ordinary skill in the art.

Before the specific implementations of this application are further described in detail, technical terms in embodiments of this application are described. Unless otherwise defined, all technical and scientific terms used in this specification have same meanings as those usually understood by a person skilled in the art of this application. In case of any inconsistency, the meaning described in this specification or the meaning obtained according to the content recorded in this specification is used. In addition, the terms used in this specification are merely for the purpose of describing embodiments of this application, but are not intended to limit this application.

3GPP, 3rd Generation Partnership Project: third generation partnership project.

Terminal: A terminal in this application is a general term of various terminal devices that can communicate with a network base station in a mobile communication network, and may be a terminal device such as a mobile phone, a tablet computer, a laptop personal computer, a personal digital assistant, a mobile Internet device, a wearable device, or an in-vehicle device. A specific type of the terminal is not limited in embodiments of this application.

gNB: a 5G base station. eNB: a 4G base station.

AMF, Access and Mobility Management Function: An access and mobility management function is responsible for mobility and access management of users.

RRC, Radio Resource Control: A radio resource control is also referred to as radio resource management (RRM) or radio resource allocation (RRA), and manages, controls, and schedules radio resources by using certain policies and methods. In addition to meeting requirements of service quality, limited radio network resources are fully utilized as much as possible to ensure that a planned coverage area is reached and service capacity and resource usage are improved as much as possible.

AS, Access stratum: an access stratum. Correspondingly, NAS is a non-access stratum, and the AS provides services for the NAS.

NAS, non-access stratum: A non-access stratum exists in a wireless communication protocol stack of a UMTS and serves as a functional layer between a core network and a terminal. This layer supports signaling and data transmission between the core network and the terminal.

PDU, Protocol Data Unit: A protocol data unit established at each layer of a transmission system in a hierarchical network structure, for example, in an open system interconnection (OSI) model.

RB, Radio Bearer: There are two types of radio bearers: data radio bearer DRB and signaling radio bearer SRB.

As a special radio bearer, the SRB is used only to transmit RRC and NAS messages. Transport channels for SRBs are defined in 3GPP TS 36.331.

SRB0 is used to transmit RRC messages on a logical channel CCCH.

SRB1 is used to transmit RRC messages (possibly including a piggybacked NAS message) on a logical channel DCCH. SRB1 has a higher priority than SRB2 before SRB2 is established.

SRB2 is used to transmit NAS messages on a logical channel DCCH and has a lower priority than SRB1. SRB2 is always configured after a security mode is activated.

The DRB is used to carry user plane data.

OAM, operations, administration and maintenance: In operations, administration and maintenance, according to actual requirements of network operation of an operator, management of a network is usually classified into three types: operations, management (Administration), and maintenance, OAM for short. The operations mainly complete daily work performed on a network and a service, such as analysis, prediction, planning, and configuration, and the maintenance is mainly a daily operation activity such as testing and fault management performed on the network and the service.

RSRP, reference signal received power: reference signal received power.

RSRQ, reference signal received quality: reference signal received quality.

SINR, signal to interference plus noise ratio: signal to interference plus noise ratio.

RSSI, received signal strength indicator: received signal strength indicator.

SSB, synchronization signal and physical broadcast channel block: synchronization signal and physical broadcast channel block.

CSI-RS, channel state information reference signal: channel state information reference signal.

SRS, sounding reference signal: sounding reference signal.

PDCCH, Physical Downlink Control Channel: physical downlink control channel.

DCI, Downlink Control Information: downlink control signaling.

Measurement events are classified into two types:

Intra-RAT measurement events (including intra-frequency and inter-frequency measurement events):

Event A1: signal quality of a serving cell is higher than an absolute threshold;

Event A2: signal quality of a serving cell is lower than an absolute threshold;

Event A3: signal quality of a neighboring cell is higher than that of a serving cell by an offset value;

Event A4: signal quality of a neighboring cell is higher than an absolute threshold; and Event A5: signal quality of a serving cell is lower than a first absolute threshold, and signal quality of a neighboring cell is higher than a second absolute threshold.

Inter-RAT measurement events:

Event B1: signal quality of a neighboring cell is higher than an absolute threshold; and Event B2: signal quality of a serving cell is lower than a first absolute threshold, and signal quality of a neighboring cell is higher than a second absolute threshold.

When radio bearers (RBs) between a terminal and a base station include only an SRB0 and an SRB1, a connection status of the terminal may be referred to as a single-signaling connected state.

Technology 1: Based on a problem that the terminal in the single-signaling connected state cannot directly initiate a handover, in a current technology, a timer is set and started.

If the terminal detects no NAS message before the timer expires, the network side is directly triggered to release the terminal.

Defects of Technology 1:

A larger value of a duration parameter indicates a longer time for the terminal in the single-signaling connected state to wait for the release. In other words, the terminal in the single-signaling connected state is less likely to be released. When quality of a signal between the terminal and a serving cell is poor, the NAS message transmission, service establishment, and a service establishment delay of the terminal cannot be guaranteed.

A smaller value of a duration parameter indicates a shorter time for the terminal in the single-signaling connected state to wait for the release. In other words, the terminal in the single-signaling connected state is more likely to be released. As a result, the terminal that needs to establish a PDU session repeatedly attempts to access a network, an access delay of the terminal increases, and a signaling storm is caused in an extreme scenario. After the terminal is released, if an NAS message needs to be transmitted or a service needs to be established between the network and the terminal subsequently, the terminal needs to re-establish a radio resource control connection. This increases system overheads and a service delay.

Based on the defects in the technology, embodiments of this application provide a communication method and a related device. A signal quality detection mechanism is designed for the terminal in the single-signaling connected state, so that the terminal in the single-signaling connection is released at a proper time, thereby reducing service loss caused by a failure in performing a timely handover by the terminal. The following describes this application in detail.

EMBODIMENT 1

As shown in FIG. 1, an embodiment of this application provides a communication method. The method includes the following steps.

S101: The network device receives a measurement report sent by a terminal.

For example, the terminal may be in a single-signaling connected state.

RBs between the terminal in the single-signaling connected state and the network device may include only a signaling SRB0 and a signaling SRB1. Alternatively, the terminal in the single-signaling connected state is a terminal that has not established a PDU session. Alternatively, after the terminal accesses a cell and before a core network indicates the terminal to establish a PDU session, the terminal is in the single-signaling connected state.

Optionally, before the terminal sends the measurement report to the network device, the network device may send a measurement configuration to the terminal.

Specifically, the measurement configuration includes a measurement object and a reporting condition. The measurement object indicates a measurement object to be measured by the terminal, and the reporting condition indicates a specific mechanism used by the terminal to report a measurement result.

In this embodiment of this application, a measurement object of the terminal may be set based on a measurement requirement. The measurement object may be set to include at least a serving cell currently connected to the terminal or at least one neighboring cell of the current serving cell. After receiving the measurement object, the terminal may measure, based on the specified measurement object, the serving cell currently connected to the terminal, or may measure a plurality of neighboring cells of the current serving cell, to meet a requirement of reconnection in a subsequent step after a radio resource control connection is released.

In this embodiment of this application, a reporting condition of the terminal may be set based on a measurement requirement. The reporting condition may be set to include at least a measurement event or a reporting periodicity. The terminal performs corresponding measurement based on the specified measurement object, and after obtaining a measurement result, may implement event-triggered reporting or periodic reporting based on the specified reporting condition. The periodic reporting means that the network device configures a reporting periodicity for the terminal, and the terminal may trigger reporting when the reporting period is reached. The event-triggered reporting means that the network device configures a measurement event for the terminal, and the terminal may trigger reporting if a measurement result of the terminal meets a requirement of the measurement event.

In some embodiments of this application, the measurement event may include at least one of the following:

Event A2: signal quality of a serving cell is lower than an absolute threshold;

Event A3: signal quality of a neighboring cell is higher than that of a serving cell by an offset value;

Event A4: signal quality of a neighboring cell is higher than an absolute threshold;

Event A5: signal quality of a serving cell is lower than a first absolute threshold, and signal quality of a neighboring cell is higher than a second absolute threshold;

Event B1: signal quality of a neighboring cell is higher than an absolute threshold; and Event B2: signal quality of a serving cell is lower than a first absolute threshold, and signal quality of a neighboring cell is higher than a second absolute threshold.

The signal quality of the serving cell or the neighboring cell may be a reference signal measurement value of the serving cell or the neighboring cell. In this application, the reference signal measurement value includes a reference signal received power (RSRP), reference signal received quality (RSRQ), a signal to interference plus noise ratio (SINR), or a received signal strength indicator (RSSI). In this application, a reference signal of the serving cell or the neighboring cell may include a synchronization signal and physical broadcast channel block (SSB) or a channel state information reference signal (CSI-RS). In this application, a reference signal of the terminal may include a sounding reference signal (SRS).

After the terminal completes measurement on the measurement object based on the specified measurement object, and obtains the measurement result, and when the measurement result meets the specified reporting condition, the terminal may report the measurement result to the network device by using the measurement report.

S102: The network device determines, based on the measurement report, whether to release a communication connection to the terminal.

The communication connection may be an RRC connection.

In this embodiment of this application, the measurement report sent by the terminal and received by the network device includes event-triggered reporting or periodic reporting. Specifically, when a reporting type of the measurement report is the event-triggered reporting, the reported measurement report in this case includes at least one specified measurement event, and the network device may determine, based on the measurement report, to release the radio resource control connection to the terminal. When a reporting type of the measurement report is periodic trigger reporting, the reported measurement report in this case includes a measurement result of measurement performed by the terminal on at least one currently connected serving cell or neighboring cell. The network device may determine, based on the measurement report, whether to release the radio resource control connection to the terminal. For example, if determining that the reference signal measurement value of the serving cell included in the measurement report is less than an absolute threshold, or the reference signal measurement value of the neighboring cell is greater than an absolute threshold, or the reference signal measurement value of the neighboring cell is greater than a reference signal measurement value of the current serving cell by an offset value, the network device determines to release the radio resource control connection to the terminal.

Optionally, before determining, based on the measurement report, to perform the release, the network device may further detect a connection status of the terminal, and perform the release when determining that the terminal is in the single-signaling connected state, to avoid service data loss caused by incorrect release of a terminal in a non-single-signaling connected state.

For example, after completing the release, the network device may further enable the terminal to send a connection establishment request to a neighboring cell whose signal quality is better than that of a serving cell connected to the terminal before the release. Specifically, when the measurement report sent by the terminal includes the signal quality of the serving cell of the serving cell currently connected to the terminal and the signal quality of the at least one neighboring cell, it is assumed that the signal quality of the neighboring cell is better than that of the serving cell currently connected to the terminal, the network device determines, based on the measurement report, to release the radio resource control connection to the terminal. In addition, a release message sent by the network device to the terminal may further carry an identifier of the neighboring cell whose signal quality is better than that of the current serving cell. The terminal may initiate, based on the identifier of the neighboring cell, a request for establishing a connection to the neighboring cell, to implement reconnection to the serving cell.

EMBODIMENT 2

Figure 2:
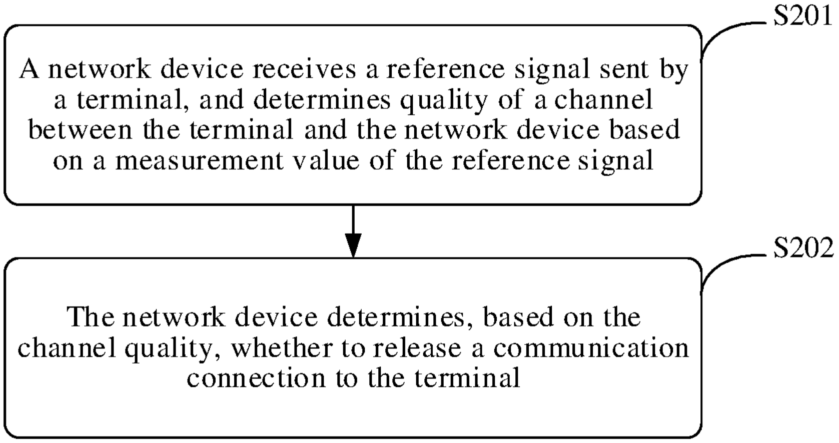
FIG. 2 is a flowchart of another communication method according to an embodiment of this application.

FIG. 2 is a flowchart of another communication method according to an embodiment of this application. The method includes the following steps.

S201: A network device receives a reference signal sent by a terminal, and determines quality of a channel between the terminal and the network device based on a reference signal measurement value.

For example, the terminal may be in a single-signaling connected state. In this embodiment of this application, the reference signal of the terminal may include a sounding reference signal (SRS). The network device configures SRS configuration information for the terminal, and sends downlink control signaling (DCI) to the terminal through a physical downlink control channel (PDCCH). The SRS configuration information may include a form of reporting an SRS configured for the terminal, and may specifically include periodic reporting signaling or trigger reporting signaling. The terminal performs periodic reporting or trigger reporting on the SRS based on the SRS configuration information carried in the received downlink control signaling. The network device evaluates the quality of the channel between the terminal in the single-signaling connected state and the network device based on the received SRS.

S202: The network device determines, based on the channel quality, whether to release a radio resource control connection to the terminal.

In this embodiment of this application, the network device determines, based on the estimated channel quality, whether to release the radio resource control connection to the terminal in the single-signaling connected state. For example, when the channel quality is lower than a specified absolute threshold, the network device may determine that the terminal in the single-signaling connected state cannot continue to share a communication service of a current network device or serving cell, and then determine to release the radio resource control connection to the terminal in the single-signaling connected state, to reduce service loss caused by a failure in performing a timely handover by the terminal.

EMBODIMENT 3

Figure 3:
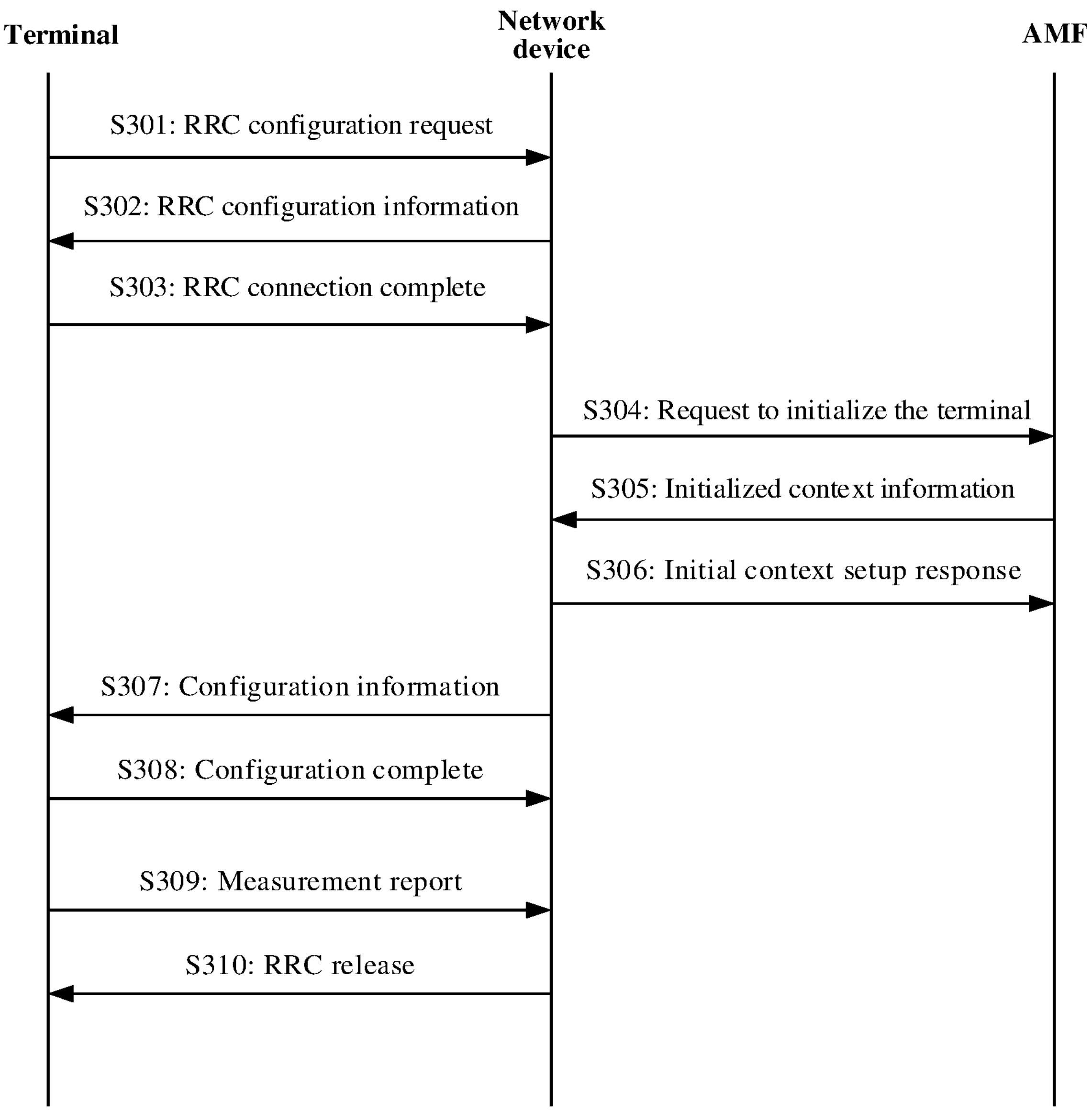
FIG. 3 is a schematic diagram of signaling interaction among a terminal, a network device, and an AMF according to an embodiment of this application.

As shown in FIG. 3, this application further provides an embodiment, and specifically describes a process of signaling interaction among a terminal, a network device, and an AMF in this application. The process includes the following steps.

S301: The terminal sends RRC configuration request signaling (RRC Setup Request) to the network device, to request to establish an RRC connection.

S302: The network device receives the RRC configuration request signaling, and sends downlink control signaling to the terminal when the terminal is admitted, where the downlink control signaling includes RRC configuration information (RRC Setup (SRB1)).

S303: The terminal completes the RRC connection to the network device based on the RRC configuration information (RRC Setup (SRB1)) included in the received downlink control signaling, and sends RRC connection complete signaling (RRC Setup Complete) to the network device.

After completing the RRC connection, the terminal enters an RRC connected mode. The following steps are subsequently performed.

S304: The network device sends request signaling (Initial UE Message) for initializing the terminal to an AMF (Access and Mobility Management Function, access and mobility management function), to request to set up a context for the terminal.

S305: The AMF receives the request for setting up the context, and sends control signaling (Initial Context Setup Request) including initialized context information to the network device.

S306: The network device sets up the context for the terminal based on the received initialized context information, and sends initial context setup response signaling to the AMF.

In this case, the network device completes establishment of the RRC connection to the terminal and context setup, but does not establish a PDU session bearer. The terminal is in a single-signaling connected state. The following steps are subsequently performed.

S307: The network device sends configuration information (RRC Connection Reconfiguration) to the terminal.

In this embodiment of this application, the configuration information configured by the network device for the terminal may include two implementations, which are specifically as follows.

In a first implementation, the configuration information includes at least a measurement object that needs to be measured by the terminal or a reporting condition. The measurement object indicates a measurement object to be measured by the terminal, and the reporting condition indicates a specific mechanism used by the terminal to report a measurement result.

In this embodiment of this application, the measurement object may be set to include at least a serving cell currently connected to the terminal or at least one neighboring cell of the current serving cell. After receiving the measurement object, the terminal may measure, based on the specified measurement object, the serving cell currently connected to the terminal, or may measure a plurality of neighboring cells of the current serving cell, and send the measurement result to the network device, to meet a requirement of reconnection in a subsequent step after the RRC connection is released.

In this embodiment of this application, the reporting condition may be set to include at least a measurement event or a reporting periodicity. The terminal performs corresponding measurement based on the specified measurement object, and after obtaining a measurement result, may implement event-triggered reporting or periodic reporting based on the specified reporting condition. The periodic reporting means that the network device configures a reporting periodicity for the terminal, and the terminal may trigger reporting when the reporting periodicity is reached. The event-triggered reporting means that the network device configures a measurement event for the terminal, and the terminal may trigger reporting if a measurement result of the terminal meets a requirement of the measurement event.

In this embodiment, the measurement event may be set to include one or more of the following listed:

- Event A2: signal quality of a serving cell is lower than an absolute threshold;
- Event A3: signal quality of a neighboring cell is higher than that of a serving cell by an offset value;
- Event A4: signal quality of a neighboring cell is higher than an absolute threshold;
- Event A5: signal quality of a serving cell is lower than a first absolute threshold, and signal quality of a neighboring cell is higher than a second absolute threshold;
- Event B1: signal quality of a neighboring cell is higher than an absolute threshold; and
- Event B2: signal quality of a serving cell is lower than a first absolute threshold, and signal quality of a neighboring cell is higher than a second absolute threshold.

The signal quality of the serving cell or the neighboring cell may be a reference signal measurement value of the serving cell or the neighboring cell. In this embodiment, the reference signal measurement value includes a reference signal received power (RSRP), reference signal received quality (RSRQ), a signal to interference plus noise ratio (SINR), or a received signal strength indicator (RSSI). In this embodiment, a reference signal of the serving cell or the neighboring cell may include a synchronization signal and physical broadcast channel block (SSB) or a channel state information reference signal (CSI-RS).

In a second implementation, the configuration information may be set to include SRS configuration information configured by the network device for the terminal. The SRS configuration information may include a form of reporting an SRS configured for the terminal, and may specifically include periodic reporting or trigger reporting. The terminal performs periodic reporting or trigger reporting on the SRS based on the SRS configuration information. The network device evaluates, based on the received SRS, quality of a channel between the terminal in a single-signaling connected state and the network device.

S308: The terminal sends configuration complete signaling (RRC Connection Reconfiguration Complete) to the network device, and performs corresponding measurement or sending based on the configuration information.

S309: The terminal sends a measurement report to the network device.

In this embodiment of this application, according to the two implementations of the configuration information in step S307, the terminal also correspondingly includes two manners of performing measurement and sending the measurement report, which are specifically as follows:

When the configuration information includes the measurement object or the reporting condition in the first implementation, the terminal measures the measurement object based on the configuration information, and sends a measurement result to the network device in a form of a measurement report. The network device may determine, based on the received measurement report, quality of a channel between the terminal and the current serving cell or the neighboring cell.

When the configuration information includes the SRS configuration information in the second implementation, the terminal performs periodic reporting or trigger reporting on the SRS based on the SRS configuration information, and the network device needs to further detect the received SRS, to determine quality of a channel between the terminal and the currently connected serving cell.

S310: The network device releases the RRC connection (RRC Release) to the terminal based on the received measurement report.

In this embodiment of this application, the network device determines, based on the received measurement report, whether to release the RRC connection to the terminal.

Corresponding to the first implementation in step S307, when a reporting type of the measurement report is event-triggered reporting, the reported measurement report in this case includes at least one specified measurement event, and the network device may determine, based on the measurement report, to release the RRC connection to the terminal. When a reporting type of the measurement report is periodic trigger reporting, the reported measurement report in this case includes a measurement result of measurement performed by the terminal on at least one serving cell currently connected or neighboring cell. The network device may determine, based on the measurement report, whether to release the radio resource control connection to the terminal. For example, if determining that the reference signal measurement value of the serving cell included in the measurement report is less than an absolute threshold, or the reference signal measurement value of the neighboring cell is greater than an absolute threshold, or the reference signal measurement value of the neighboring cell is greater than a reference signal measurement value of the current serving cell by an offset value, the network device determines to release the RRC connection to the terminal.

Corresponding to the second implementation in step S307, when the measurement report sent by the terminal to the network device includes only the SRS, the network device needs to evaluate, based on the SRS, the quality of the channel between the terminal in the single-signaling connected state and the network device, and determine, based on the evaluated channel quality, whether to release the RRC connection to the terminal in the single-signaling connected state. For example, when the channel quality is lower than a specified absolute threshold, it may be determined that the terminal in the single-signaling connected state cannot continue to share a communication service of a current network device or serving cell, and the network device determines to release the RRC connection to the terminal in the single-signaling connected state.

EMBODIMENT 4

Figure 4:
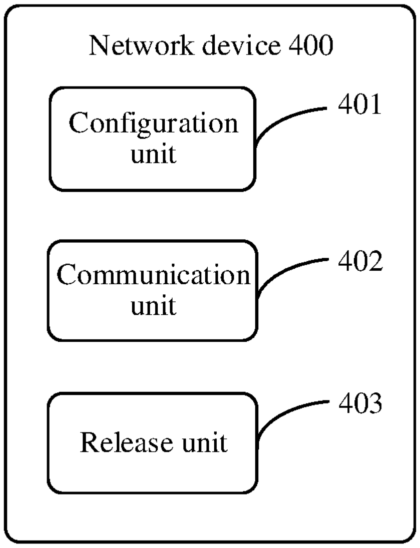
FIG. 4 is an architectural diagram of a network device according to an embodiment of this application.

FIG. 4 is an architectural diagram of a network device according to an embodiment of this application. The network device 400 includes a configuration unit 401, a communication unit 402, and a release unit 403.

The configuration unit 401 is configured to configure a measurement configuration, where the measurement configuration includes a measurement object and a reporting condition.

In this embodiment of this application, the measurement object indicates a measurement object to be measured by a terminal, and the reporting condition indicates a mechanism used by the terminal to report a measurement result. The measurement object may be set to include at least a serving cell currently connected to the terminal or at least one neighboring cell of the current serving cell. After receiving the measurement object, the terminal may measure, based on the specified measurement object, the serving cell currently connected to the terminal, or may measure a plurality of neighboring cells of the current serving cell, to meet a requirement of reconnection in a subsequent step after a radio resource control connection is released. The reporting condition may be set to include at least a measurement event or a reporting periodicity. The terminal performs corresponding measurement based on the specified measurement object, and after obtaining a measurement result, may implement event-triggered reporting or periodic reporting based on the specified reporting condition. The periodic reporting means that the configuration unit 401 configures a reporting periodicity for the terminal, and the terminal may trigger reporting when the reporting period is reached. The event-triggered reporting means that the configuration unit 401 configures a measurement event for the terminal, and the terminal may trigger reporting if a measurement result of the terminal meets a requirement of the measurement event.

In some embodiments of this application, the measurement event may include at least one of the following:

Intra-RAT measurement events (including intra-frequency and inter-frequency measurement events):

- Event A2: signal quality of a serving cell is lower than an absolute threshold;
- Event A3: signal quality of a neighboring cell is higher than that of a serving cell by an offset value;
- Event A4: signal quality of a neighboring cell is higher than an absolute threshold; and
- Event A5: signal quality of a serving cell is lower than a first absolute threshold, and signal quality of a neighboring cell is higher than a second absolute threshold.

Inter-RAT measurement events:

- Event B1: signal quality of a neighboring cell is higher than an absolute threshold; and
- Event B2: signal quality of a serving cell is lower than a first absolute threshold, and signal quality of a neighboring cell is higher than a second absolute threshold.

The signal quality of the serving cell or the neighboring cell may be a reference signal measurement value of the serving cell or the neighboring cell. In this application, the reference signal measurement value includes a reference signal received power (RSRP), reference signal received quality (RSRQ), a signal to interference plus noise ratio (SINR), or a received signal strength indicator (RSSI). In this application, a reference signal of the serving cell or the neighboring cell may include a synchronization signal and physical broadcast channel block (SSB) or a channel state information reference signal (CSI-RS). In this application, a reference signal of the terminal may include a sounding reference signal (SRS).

The communication unit 402 is configured to send the measurement configuration to the terminal, and receive a measurement report sent by the terminal.

In this embodiment of this application, the measurement report sent by the terminal and received by the communication unit 402 includes event-triggered reporting or periodic reporting. Specifically, when a reporting type of the measurement report is the event-triggered reporting, the reported measurement report in this case includes at least one of the foregoing specified measurement events. When a reporting type of the measurement report is periodic trigger reporting, the reported measurement report in this case includes a measurement result of measurement performed by the terminal on at least one currently connected serving cell or neighboring cell.

The release unit 403 is configured to determine, based on the measurement report, whether to release the radio resource control connection to the terminal.

In this embodiment of this application, when the measurement report includes at least one specified measurement event, the release unit 403 may release the radio resource control connection to the terminal. Alternatively, when the measurement report includes the reference signal measurement value of measurement performed by the terminal on the at least one currently connected serving cell or neighboring cell, assuming that the reference signal measurement value of the serving cell included in the measurement report is less than an absolute threshold, or the reference signal measurement value of the neighboring cell is greater than an absolute threshold, or the reference signal measurement value of the neighboring cell is greater than a reference signal measurement value of the current serving cell by an offset value, it is determined to release the radio resource control connection to the terminal.

In some embodiments of this application, before the release is performed, a connection status of the terminal may be further detected, and the release is performed when it is determined that the terminal is in a single-signaling connected state.

In some embodiments of this application, after the release is completed, the terminal may further send a connection establishment request to a neighboring cell whose signal quality is better than that of a serving cell connected to the terminal before the release. Specifically, when the measurement report sent by the terminal includes the signal quality of the serving cell of the serving cell currently connected to the terminal and the signal quality of the at least one neighboring cell, it is assumed that the signal quality of the neighboring cell is better than that of the serving cell currently connected to the terminal, the network device determines, based on the measurement report, to release the radio resource control connection to the terminal. In addition, a release message sent by the network device to the terminal may further carry an identifier of the neighboring cell whose signal quality is better than that of the current serving cell, and the terminal may initiate, based on the identifier of the neighboring cell, a request for establishing a connection to the neighboring cell, to implement reconnection to the serving cell.

EMBODIMENT 5

Figure 5:
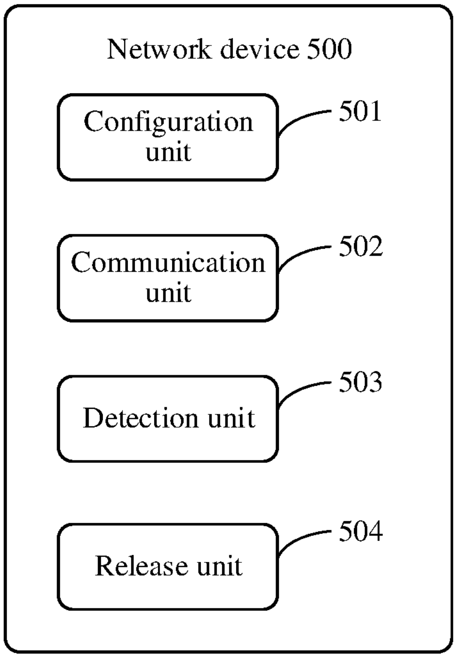
FIG. 5 is an architectural diagram of another network device according to an embodiment of this application.

FIG. 5 is an architectural diagram of another network device according to an embodiment of this application. The network device 500 includes a configuration unit 501, a communication unit 502, a detection unit 503, and a release unit 504.

The configuration unit 501 is configured to configure SRS configuration information.

In this embodiment of this application, the SRS configuration information may include configuration information for indicating a terminal to periodically report an SRS, and may further include configuration information for indicating the terminal to trigger reporting of an SRS.

The communication unit 502 is configured to send the SRS configuration information to the terminal, and receive an SRS sent by the terminal.

The detection unit 503 is configured to determine quality of a channel between the terminal in a single-signaling connected state and the network device based on a measurement value of the SRS.

In this embodiment of this application, the detection unit 503 measures the received SRS, for example, measures a strength degree and an interference degree of the received SRS, and evaluates, based on the measurement value of the SRS, the quality of the channel between the terminal in the single-signaling connected state and the network device.

The release unit 504 is configured to determine, based on the channel quality, whether to release a radio resource control connection to the terminal.

In this embodiment of this application, the release unit 504 determines, based on an evaluation result of the channel quality, whether to release the radio resource control connection between the terminal in the single-signaling connected state and the network device. For example, when the channel quality is lower than a specified absolute threshold, the release unit 504 may determine that the terminal in the single-signaling connected state cannot continue to share a communication service of a current network device or serving cell, and then determine to release the radio resource control connection to the terminal in the single-signaling connected state, to reduce service loss caused by a failure in performing a timely handover by the terminal.

EMBODIMENT 6

Figure 6:
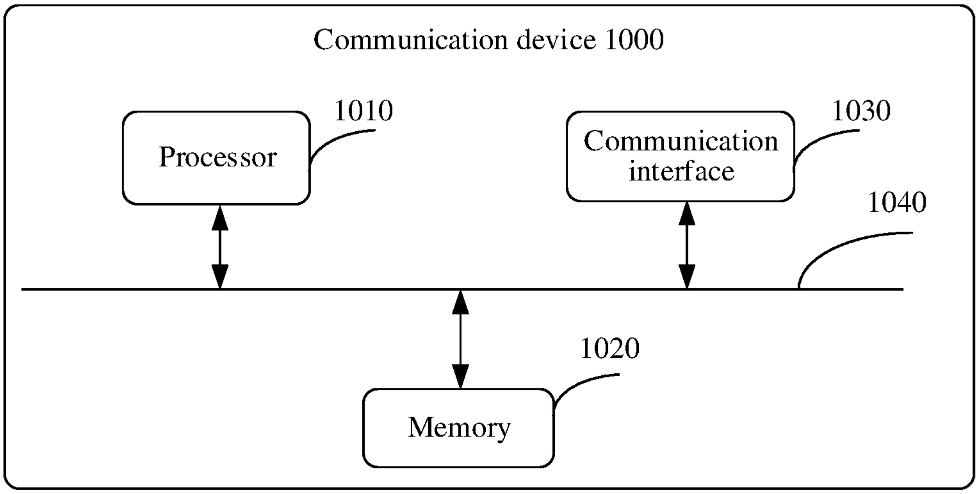
FIG. 6 is an architectural diagram of a communication device according to an embodiment of this application.

FIG. 6 is a schematic diagram of a structure of a communication device 1000 according to an embodiment of this application. The communication device 1000 includes a processor 1010, a memory 1020, a communication interface 1030, and a bus 1040.

It should be understood that the communication interface 1030 in the communication device 1000 shown in FIG. 6 may be used for communication with another device.

The processor 1010 may be connected to the memory 1020. The memory 1020 may be configured to store program code and data. Therefore, the memory 1020 may be an internal storage module of the processor 1010, may be an external storage module independent of the processor 1010, or may be a component that includes an internal storage module of the processor 1010 and an external storage module independent of the processor 1010.

The communication device 1000 may further include the bus 1040. The memory 1020 and the communication interface 1030 may be connected to the processor 1010 through the bus 1040. The bus 1040 may be a peripheral component interconnect (PCI) bus, an extended industry standard architecture (EISA) bus, or the like. The bus 1040 may be classified into an address bus, a data bus, a control bus, or the like. For ease of representation, only one line is used for representation in FIG. 6, but this does not mean that there is only one bus or only one type of bus.

It should be understood that, in this embodiment of this application, the processor 1010 may be a central processing unit (CPU). The processor may be alternatively a general-purpose processor, a digital signal processor (DSP), an application-specific integrated circuit (ASIC), a field programmable gate array (FPGA) or another programmable logical device, a discrete gate or transistor logic device, or a discrete hardware component. The general-purpose processor may be a microprocessor, or the processor may be any conventional processor or the like. Alternatively, the processor 1010 uses one or more integrated circuits to execute a related program, to implement the technical solutions provided in embodiments of this application.

The memory 1020 may include a read-only memory and a random access memory, and provides instructions and data to the processor 1010. A part of the processor 1010 may further include a non-volatile random access memory. For example, the processor 1010 may further store device type information.

When the communication device 1000 runs, the processor 1010 executes computer-executable instructions in the memory 1020 to perform the operation steps of the foregoing method.

It should be understood that the communication device 1000 according to this embodiment of this application may correspond to a corresponding execution body of the method according to embodiments of this application, and the foregoing and other operations and/or functions of modules in the communication device 1000 are separately intended to implement corresponding procedures of the methods in the embodiments. For simplicity, details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or a compact disc.

An embodiment of this application further provides a computer-readable storage medium, where a computer program is stored on the computer-readable storage medium, and when being executed by a processor, the program is used to perform a diversification issue generation method. The method includes at least one of solutions described in the foregoing embodiments.

The computer storage medium according to this embodiment of this application may be any combination of one or more computer-readable media. The computer-readable medium may be a computer-readable signal medium or a computer-readable storage medium. The computer-readable storage medium may be but is not limited to an electric, magnetic, optical, electromagnetic, infrared, or semiconductor system, apparatus, or device, or any combination thereof. More specific examples (a non-exhaustive list) of the computer-readable storage medium include an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this document, the computer-readable storage medium may be any tangible medium including or storing a program that may be used by an instruction execution system, apparatus, or device, or be used in combination with an instruction execution system, apparatus, or device.

A computer-readable signal medium may include a data signal propagated in a baseband or propagated as part of a carrier, where the data signal carries computer-readable program code. Such a propagated data signal may take a variety of forms, including but not limited to an electromagnetic signal, an optical signal, or any suitable combination thereof. The computer-readable signal medium may alternatively be any computer-readable medium other than the computer-readable storage medium. The computer-readable medium may send, propagate, or transmit the program used by the instruction execution system, apparatus, or device, or used in combination with the instruction execution system, apparatus, or device.

The program code included in the computer-readable medium may be transmitted by using any suitable medium, including but not limited to wireless, a wire, an optical cable, RF, and the like, or any suitable combination thereof.

Computer program code for performing the operations in this application may be written in one or more programming languages, or a combination thereof. The programming languages include an object-oriented programming language, such as Java, Smalltalk, and C++, and also include a conventional procedural programming language, such as a "C" language or a similar programming language. The program code may be executed entirely on a user computer, or some may be executed on a user computer as a separate software package, or some may be executed on a user computer while some is executed on a remote computer, or the code may be entirely executed on a remote computer or a server. When a remote computer is involved, the remote computer may be connected to a user computer by using any type of network, including a local area network (LAN) or a wide area network (WAN), or may be connected to an external computer (for example, connected by using an Internet service provider through the Internet).

It should be noted that the foregoing are merely example embodiments of this application and used technical principles. A person skilled in the art may understand that this application is not limited to specific embodiments described herein, and a person skilled in the art may make various obvious changes, readjustments, and replacements without departing from the protection scope of this application. Therefore, although this application is described in detail with reference to the foregoing embodiments, this application is not limited to the foregoing embodiments. More other equivalent embodiments may be included without departing from the concept of this application, and all fall within the protection scope of this application.

What is claimed is:

1. A communication method comprising:

receiving, by a network device, a measurement report from a terminal when the terminal is in a single-signaling connected state;

detecting, by the network device, a connection status of the terminal;

determining, by the network device based on the measurement report, whether to release a communication connection to the terminal in the single-signaling connected state; and performing, by the network device, a release when determining that the terminal is in the single-signaling connected state.

2. The method according to claim 1, wherein radio bearers RBs between the terminal in the single-signaling connected state and the network device comprise only a signaling radio bearer 0 (SRB0) and a signaling radio bearer (SRB1).

3. The method according to claim 1, wherein the communication connection is a radio resource control (RRC) connection.

4. The method according to claim 1, further comprising: sending, by the network device, a measurement configuration to the terminal, wherein the measurement configuration comprises a measurement object and a reporting condition.

5. The method according to claim 4, wherein the measurement object comprises a serving cell currently connected to the terminal, or at least one neighboring cell of the currently connected serving cell.

6. The method according to claim 4, wherein the reporting condition comprises a measurement event or a reporting periodicity.

7. The method according to claim 6, wherein the measurement event comprises:

Event A2: signal quality of a serving cell is lower than an absolute threshold,

Event A3: signal quality of a neighboring cell is higher than that of a serving cell by an offset value, Event A4: signal quality of a neighboring cell is higher than an absolute threshold, Event A5: signal quality of a serving cell is lower than a first absolute threshold, and signal quality of a neighboring cell is higher than a second absolute threshold, Event B1: signal quality of a neighboring cell is higher than an absolute threshold, or Event B2: signal quality of a serving cell is lower than a first absolute threshold, and signal quality of a neighboring cell is higher than a second absolute threshold.

8. The method according to claim 7, wherein the measurement report comprises at least one of the measurement events.

9. The method according to claim 6, wherein the measurement report comprises a reference signal measurement value of at least one currently connected serving cell or neighboring cell.

10. The method according to claim 1, further comprising, after completing the release, enabling the terminal to send a connection establishment request to a neighboring cell whose signal quality is better than that of a serving cell connected to the terminal before the release.

11. A network device, comprising:

a communication interface configured to receive a measurement report from a terminal when the terminal is in a single-signaling connected state; and at least one processor configured to:

detect a connection status of the terminal;

determine, based on the measurement report, whether to release a communication connection to the terminal in the single-signaling connected state; and perform a release when determining that the terminal is in the single-signaling connected state.

12. The device according to claim 11, wherein radio bearers RBs between the terminal in the single-signaling connected state and the network device comprise only a signaling radio bearer 0 (SRB0) and a signaling radio bearer (SRB1).

13. The device according to claim 11, wherein the communication connection is a radio resource control (RRC) connection.

14. The device according to claim 11, wherein the at least one processor is further configured to configure a measurement configuration, the communication interface is configured to send the measurement configuration to the terminal, and wherein the measurement configuration comprises a measurement object and a reporting condition.

15. The device according to claim 14, wherein the measurement object comprises a serving cell currently connected to the terminal, or at least one neighboring cell of the currently connected serving cell.

16. The device according to claim 15, wherein the reporting condition comprises a measurement event or a reporting periodicity.

17. The device according to claim 16, wherein the measurement event comprises:

Event A2: signal quality of a serving cell is lower than an absolute threshold,

Event A3: signal quality of a neighboring cell is higher than that of a serving cell by an offset value, Event A4: signal quality of a neighboring cell is higher than an absolute threshold, Event A5: signal quality of a serving cell is lower than a first absolute threshold, and signal quality of a neighboring cell is higher than a second absolute threshold, Event B1: signal quality of a neighboring cell is higher than an absolute threshold, or Event B2: signal quality of a serving cell is lower than a first absolute threshold, and signal quality of a neighboring cell is higher than a second absolute threshold.

* * * * *